(12) United States Patent
Naughton et al.

(10) Patent No.: US 8,407,902 B2
(45) Date of Patent: Apr. 2, 2013

(54) RECIPROCATING POWER TOOL HAVING A COUNTERBALANCE DEVICE

(75) Inventors: Michael Naughton, Dousman, WI (US); Kurt Limberg, Milwaukee, WI (US); John S. Scott, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 340 days.

(21) Appl. No.: 12/721,210

(22) Filed: Mar. 10, 2010

(65) Prior Publication Data
US 2010/0162579 A1 Jul. 1, 2010

Related U.S. Application Data

(63) Continuation-in-part of application No. 12/399,839, filed on Mar. 6, 2009.

(60) Provisional application No. 61/034,816, filed on Mar. 7, 2008.

(51) Int. Cl.
*B23D 49/16* (2006.01)
(52) U.S. Cl. .................. 30/393; 30/392; 74/50
(58) Field of Classification Search .............. 30/392, 30/393, 394; 74/50
See application file for complete search history.

(56) References Cited

U.S. PATENT DOCUMENTS

| | | | |
|---|---|---|---|
| 2,766,629 A | 10/1956 | Booth | |
| 2,879,815 A * | 3/1959 | Papworth | 30/374 |
| 2,946,358 A * | 7/1960 | Bruck | 30/393 |
| 2,961,016 A * | 11/1960 | Papworth | 30/393 |
| 3,023,628 A | 3/1962 | Heppner | |
| 3,642,002 A | 2/1972 | Otterstrom | |
| 3,750,483 A | 8/1973 | Burrows et al. | |
| 3,802,079 A | 4/1974 | Ketchpel, Jr. et al. | |
| 3,832,772 A | 9/1974 | Sumida | |
| 3,878,733 A | 4/1975 | Tertinek | |
| 4,143,737 A | 3/1979 | Erich, Jr. | |
| 4,206,657 A | 6/1980 | Palm | |
| 4,389,137 A | 6/1983 | Riedl | |
| 4,793,196 A | 12/1988 | Davis et al. | |
| 4,870,870 A | 10/1989 | Quirk et al. | |
| 4,942,776 A | 7/1990 | Quirk et al. | |
| 5,025,562 A | 6/1991 | Palm | |
| 5,079,844 A | 1/1992 | Palm | |
| 5,134,777 A | 8/1992 | Meyer et al. | |
| 5,205,043 A | 4/1993 | Batt et al. | |
| 5,212,887 A | 5/1993 | Farmerie | |
| 5,231,886 A | 8/1993 | Quirk et al. | |
| 5,466,183 A | 11/1995 | Kirn et al. | |

(Continued)

FOREIGN PATENT DOCUMENTS

| | | |
|---|---|---|
| EP | 1710052 | 10/2006 |
| EP | 1779980 | 5/2007 |

(Continued)

*Primary Examiner* — Hwei C Payer
(74) *Attorney, Agent, or Firm* — Michael Best & Friedrich LLP

(57) ABSTRACT

A reciprocating power tool that includes a drive system having a first driven gear that includes a spindle counterbalance weight and a second driven gear that includes a spindle counterbalance weight. The first driven gear and the second driven gear rotate in opposite directions about an axis of rotation in response to rotation of a driving gear by a motor. The power tool further includes a spindle having a longitudinal axis and a first end that is configured to support a tool element. The spindle is coupled to one of the first driven gear and the second driven gear by a scotch yoke mechanism to reciprocate the spindle with respect to a housing of the power tool along the longitudinal axis of the spindle in response to operation of the motor.

12 Claims, 14 Drawing Sheets

U.S. PATENT DOCUMENTS

| | | |
|---|---|---|
| RE35,258 E | 6/1996 | Palm |
| 5,561,909 A | 10/1996 | Berg et al. |
| 5,644,846 A | 7/1997 | Durr et al. |
| 5,825,663 A | 10/1998 | Barba et al. |
| 5,964,039 A | 10/1999 | Mizoguchi et al. |
| 6,139,218 A | 10/2000 | Cochran |
| 6,178,646 B1 | 1/2001 | Schnell et al. |
| 6,230,411 B1 | 5/2001 | Wall et al. |
| 6,286,611 B1 | 9/2001 | Bone |
| 6,357,124 B1 | 3/2002 | Wall et al. |
| 6,568,089 B1 | 5/2003 | Popik et al. |
| 6,625,892 B2 | 9/2003 | Takahashi et al. |
| 6,671,969 B2 | 1/2004 | Phillips et al. |
| 6,725,548 B1 | 4/2004 | Kramer et al. |
| RE38,606 E | 10/2004 | Bednar et al. |
| 6,810,589 B2 | 11/2004 | Lagaly et al. |
| 6,892,459 B2 | 5/2005 | Okumura et al. |
| 6,920,814 B2 | 7/2005 | Gass et al. |
| 6,976,313 B2 | 12/2005 | Wong |
| 7,096,589 B2 | 8/2006 | Phillips et al. |
| 7,114,259 B2 | 10/2006 | Wang |
| 7,178,244 B2 | 2/2007 | Fossella |
| 7,191,847 B2 | 3/2007 | Haas |
| 7,204,026 B2 | 4/2007 | Phillips et al. |
| 7,216,433 B2 | 5/2007 | Haas et al. |
| 7,246,533 B2 | 7/2007 | Lagaly et al. |
| 7,331,407 B2 | 2/2008 | Stirm et al. |
| 7,363,713 B2 | 4/2008 | Hirabayashi et al. |
| 7,445,056 B2 | 11/2008 | Stirm et al. |
| 7,533,736 B2 | 5/2009 | Stirm et al. |
| 7,562,721 B2 | 7/2009 | Stirm et al. |
| 7,658,012 B2 | 2/2010 | James et al. |
| 2003/0145472 A1 | 8/2003 | Swift |
| 2005/0022395 A1 | 2/2005 | Hirabayashi |
| 2006/0220612 A1 | 10/2006 | Feldmann et al. |
| 2006/0260141 A1 | 11/2006 | Phillips et al. |
| 2007/0017684 A1 * | 1/2007 | Stirm et al. .................. 173/109 |
| 2007/0144310 A1 | 6/2007 | Pozgay et al. |
| 2007/0144752 A1 | 6/2007 | Pozgay et al. |
| 2007/0214660 A1 | 9/2007 | Bone |
| 2008/0010840 A1 | 1/2008 | Lagaly et al. |
| 2008/0047150 A1 | 2/2008 | Phillips et al. |
| 2008/0189961 A1 | 8/2008 | Oberheim |
| 2009/0223071 A1 | 9/2009 | Alberti et al. |

FOREIGN PATENT DOCUMENTS

| | | |
|---|---|---|
| EP | 1818141 | 8/2007 |
| EP | 1932626 | 6/2008 |
| EP | 1932627 | 6/2008 |

* cited by examiner

RECIPROCATING POWER TOOL HAVING A COUNTERBALANCE DEVICE

CROSS-REFERENCE TO RELATED APPLICATIONS

The present patent application is a continuation-in-part of U.S. patent application Ser. No. 12/399,839, filed Mar. 6, 2009, which claims priority to U.S. Provisional Patent Application No. 61/034,816, filed Mar. 7, 2008, the entire contents of which are all hereby incorporated by reference.

BACKGROUND

The present invention relates to a reciprocating saw, and, more particularly, to a portable, battery powered reciprocating saw.

Reciprocating saws are used to cut a variety of objects made from a variety of materials, such as metal pipes, wood and dry wall. A cordless, compact reciprocating saw allows for cutting operations in tight spaces or awkward angles for plumbing, electrical, remodeling and HVAC applications.

SUMMARY

In one embodiment, the invention provides a reciprocating power tool including a housing and a motor supported by the housing and having an output shaft. The motor is operable to rotate the output shaft. A drive system is coupled to the output shaft of the motor. The drive system includes a driving gear coupled to the output shaft for rotation with the output shaft and a first driven gear having a spindle counterbalance weight. The first driven gear is coupled to the driving gear such that the first driven gear is configured to rotate about an axis of rotation in a first direction in response to rotation of the driving gear by the motor. The drive system further includes a second driven gear having a spindle counterbalance weight. The second driven gear is coupled to the driving gear such that the second driven gear is configured to rotate about the axis of rotation in a second direction that is opposite the first direction in response to rotation of the driving gear by the motor. The power tool further includes a spindle having a longitudinal axis and a first end that is configured to support a tool element. The spindle is coupled to one of the first driven gear and the second driven gear by a scotch yoke mechanism to reciprocate the spindle with respect to the housing along the longitudinal axis of the spindle in response to operation of the motor.

In another embodiment the invention provides a reciprocating saw including a housing and a motor supported by the housing and having an output shaft. The motor is operable to rotate the output shaft. A drive system is coupled to the output shaft of the motor. The drive system includes a driving gear coupled to the output shaft for rotation with the output shaft and a first driven gear having a spindle counterbalance weight. The first driven gear is coupled to the driving gear such that the first driven gear is configured to rotate about an axis of rotation in a first direction in response to rotation of the driving gear by the motor. A second driven gear having a spindle counterbalance weight is coupled to the driving gear such that the second driven gear is configured to rotate about the axis of rotation in a second direction that is opposite the first direction in response to rotation of the driving gear by the motor. The saw further includes a spindle having a first end, a second end, and a longitudinal axis that extends through the first end and the second end. A blade clamp is coupled to the first end of the spindle and the blade clamp is configured to couple a saw blade to the spindle. A yoke is coupled to the second end of the spindle. The drive system further includes a pin coupled to one of the first driven gear and the second driven gear for rotation with the one of the first driven gear and the second driven gear and the pin extends into the yoke to reciprocate the spindle with respect to the housing along the longitudinal axis of the spindle in response to operation of the motor.

In another embodiment the invention provides a reciprocating saw that includes a housing and a handle configured for a user. The handle includes a longitudinal axis defining a first axis of the saw. A switch is adjacent the handle and is operable by the user when the user grips the handle. A motor is supported by the housing and includes an output shaft. The motor is operable to rotate the output shaft about a longitudinal axis of the output shaft that defines a second axis of the saw. The output shaft is configured to rotate in response to operation of the switch by the user. The saw further includes a drive system coupled to the output shaft of the motor. The drive system includes a driving gear coupled to the output shaft for rotation with the output shaft and a driven gear having a spindle counterbalance weight. The driven gear is coupled to the driving gear such that the driven gear is configured to rotate about an axis of rotation in a first direction in response to rotation of the driving gear by the motor. The saw further includes a spindle having a first end, a second end, and a longitudinal axis that extends through the first end and the second end. The longitudinal axis of the spindle defines a third axis of the saw. A blade clamp is coupled to the first end of the spindle and the blade clamp is configured to couple a saw blade to the spindle. The spindle is coupled to the driven gear to reciprocate the spindle with respect to the housing in response to rotation of the output shaft of the motor and each of the first axis, the second axis, and the third axis are oblique with respect to each of the other axes.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

A portable hand tool 20 or a portable reciprocating saw is shown in FIGS. 1-9. In these constructions, the saw 20 is a battery-powered reciprocating saw. In the illustrated constructions, the saw 20 is powered by a power tool battery pack 25. The battery pack 25 may be configured to connect and power a variety of tools in addition to the reciprocating saw 20. In the construction shown, the battery pack 25 is a 12V lithium-ion battery pack. The pack 25 includes three (3) battery cells (not shown) connected in series. In other embodiments, the battery pack 25 may include fewer or more battery cells, such that the battery pack 25 is a 14.4-volt power tool battery pack, an 18-volt power tool battery pack, or the like. Additionally or alternatively, the battery cells may have chemistries other than lithium-ion such as, for example, nickel cadmium, nickel metal-hydride, or the like. In still other constructions, the saw 20 may be a corded power tool. In other embodiments, the power tool may be another handheld power tool, such as, for example, another type of reciprocating power tool, a drill, a screwdriver, or other handheld power tool.

Figure 8:
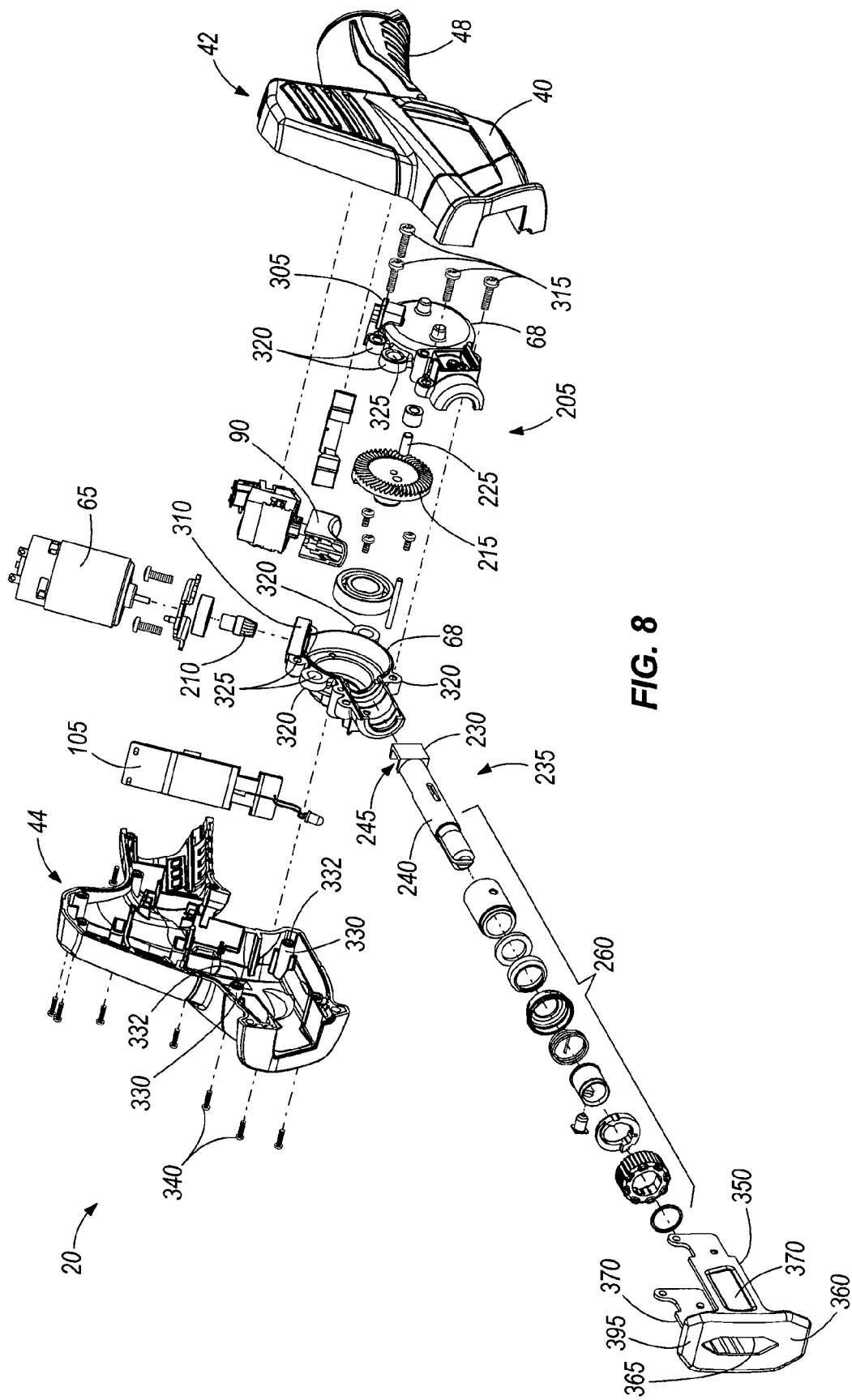
FIG. 8 is an exploded view of the portable reciprocating saw shown in FIG. 1*a*.

The saw 20 includes a housing 40. As shown in FIG. 8, the housing 40 has a first housing portion 42 and a second housing portion 44. Each housing portion 42, 44 is formed of plastic; however, in some embodiments, the housing portions 42, 44 may be formed of other materials. In the construction shown, bosses 330 are formed in both housing portions 42, 44. Each boss 330 includes an aperture 332, and each aperture 332 extends through each housing portion 42, 44. When the housing portions 42, 44 are assembled, the apertures 332 from the first housing portion 42 generally align with the apertures 332 from the second housing portion 44. In some constructions, the bosses 330 from the first housing portion 42 align with and are in physical contact with the bosses 330 formed in the second housing portion 44. In other constructions, the bosses 330 may be adjacent to respective bosses 330, although not in physical contact with each other. In some constructions, the bosses 330 may be of the same height. In other constructions, the bosses 330 may be of different height, such that to engage with each other, bosses 330 on one of the housing portions 42, 44 extend further than the bosses 330 on the other of the housing portions 42, 44 (e.g., beyond a interface line between the housing portions 42, 44).

Figure 7:
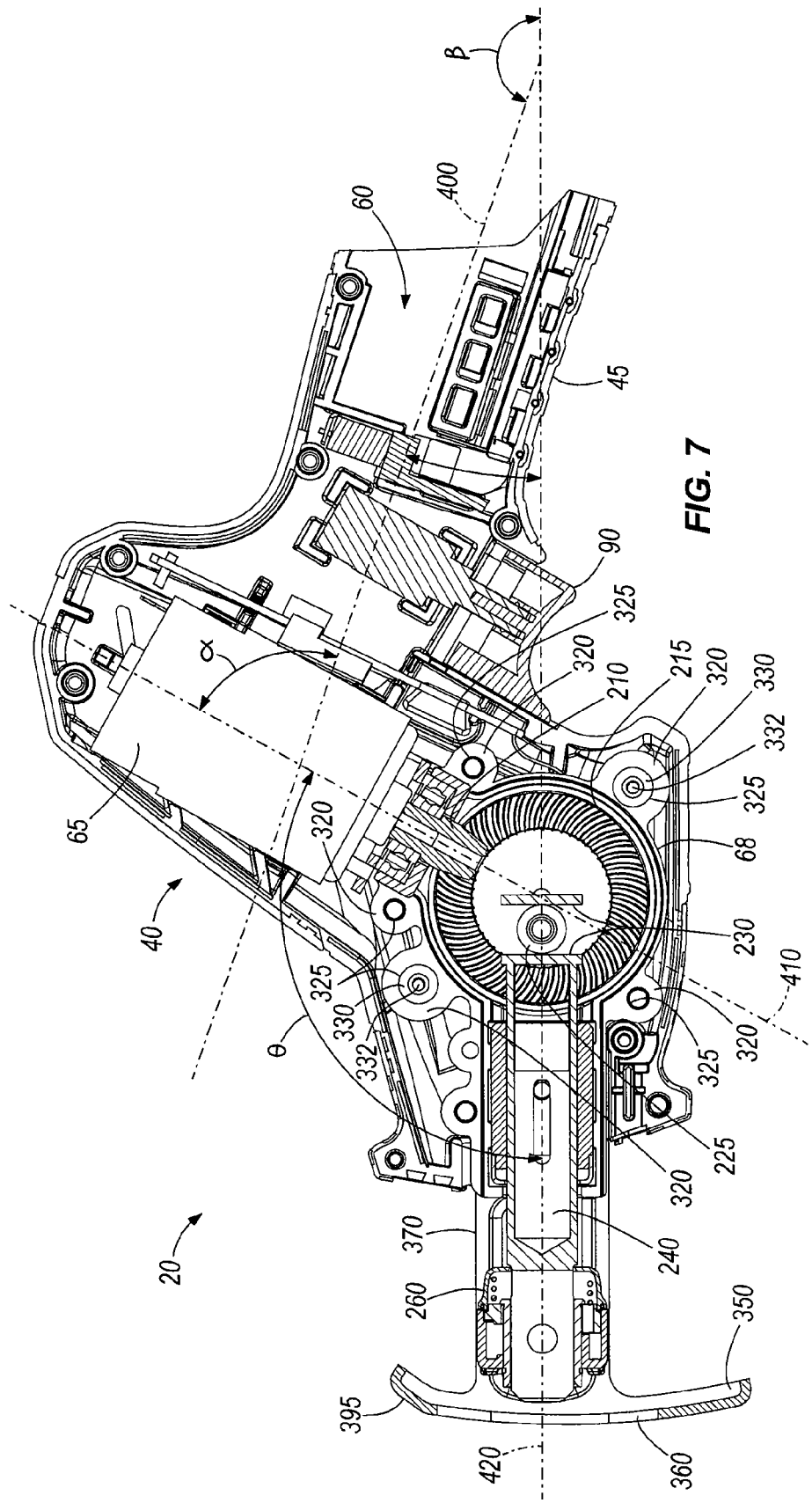
FIG. 7 is a cross section view of the portable reciprocating saw shown in FIG. 1*a*.

The housing 40 defines a handle housing portion 45, a motor housing portion 50 and a gear case housing portion 55. The handle housing portion 45 includes at least one grip surface 48 for a user to grasp. In the illustrated constructions, the handle housing portion 45 can also define a battery receiving portion 60 (FIGS. 2 and 6) for receiving the battery pack 25. In other constructions, the battery receiving portion 60 may be defined elsewhere within the housing 40. The motor housing portion 50 supports a motor 65 (FIGS. 7 and 8), and the gear case housing portion 55 in turn supports a gear case 68 (FIGS. 7 and 8).

Figure 1:
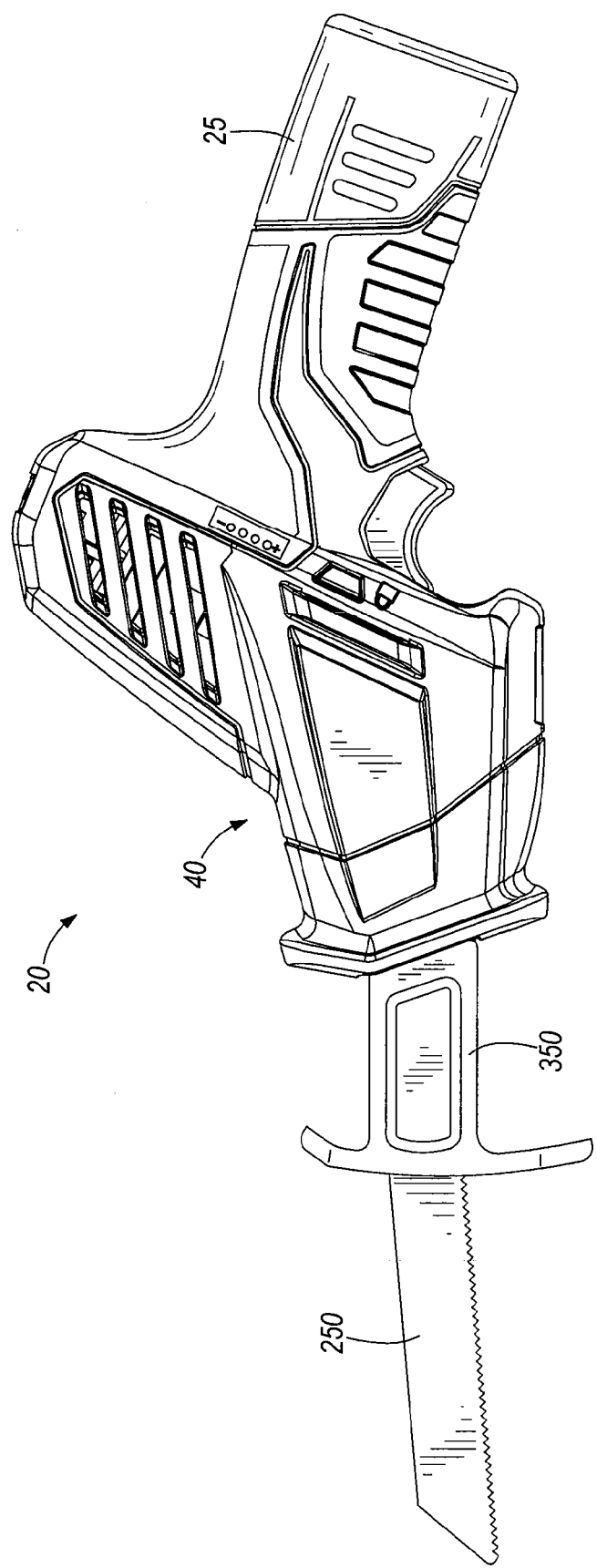
FIG. 1 is a side view of a portable battery-powered reciprocating saw according to an embodiment of the invention.
Figure 1A:
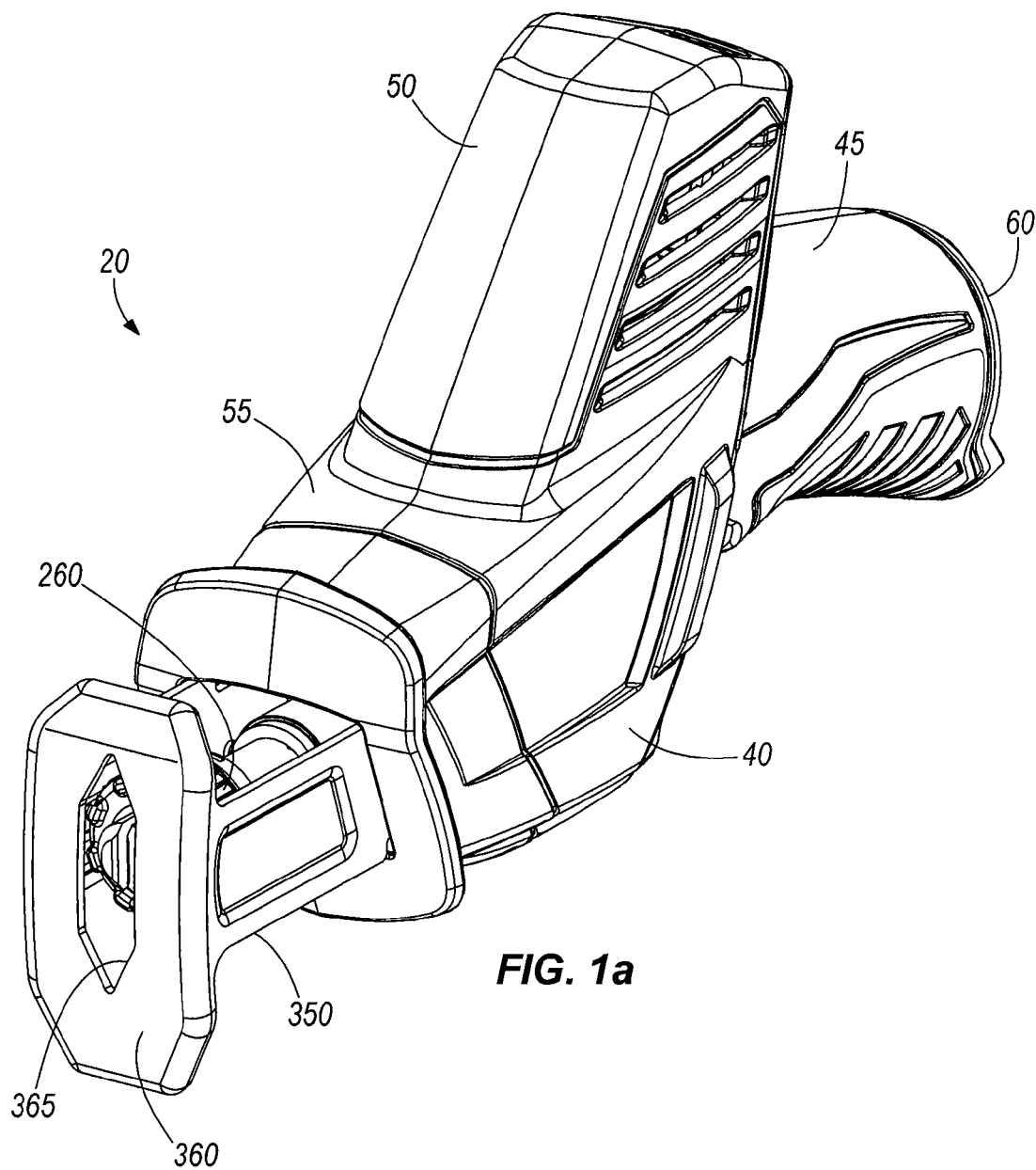
FIG. 1*a* is a perspective view of the portable battery-powered reciprocating saw shown in FIG. 1 with a blade and battery pack removed.
Figure 2:
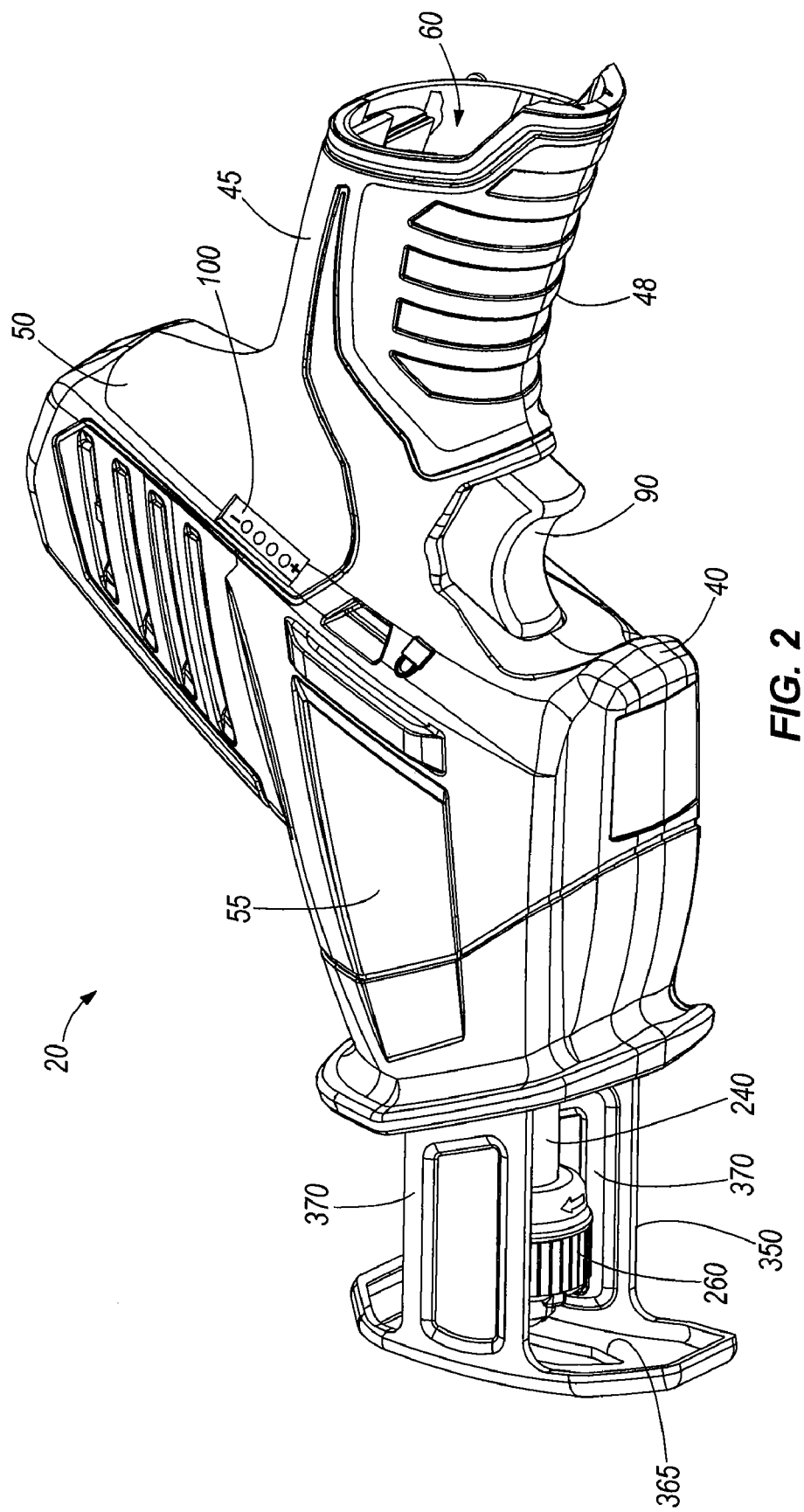
FIG. 2 is another perspective view of the portable reciprocating saw shown in FIG. 1*a*.

As shown in FIG. 1, the battery receiving portion 60 is configured as a cavity. When the battery pack 25 is connected to the saw 20, the pack 25 is inserted into the cavity 60 and substantially closes the cavity 60. A terminal block 70 (FIG. 6) is positioned in the cavity 60. The terminal block 70 includes a positive terminal 75, a negative terminal 80 and a sense terminal 85. The terminals 75, 80 electrically connect the battery pack 25 to the motor 65. The sense terminal 85 electrically connects the battery pack 25 to a monitoring circuit 105, which is discussed below.

As shown in FIGS. 2-4 and 7, a switch 90 is positioned on the handle housing portion 45 for powering the saw 20. As illustrated, the switch 90 is an on/off trigger switch. In other embodiments, the switch 90 may be a variable speed trigger switch, a two speed trigger switch, a push button or other actuator.

Figure 4:
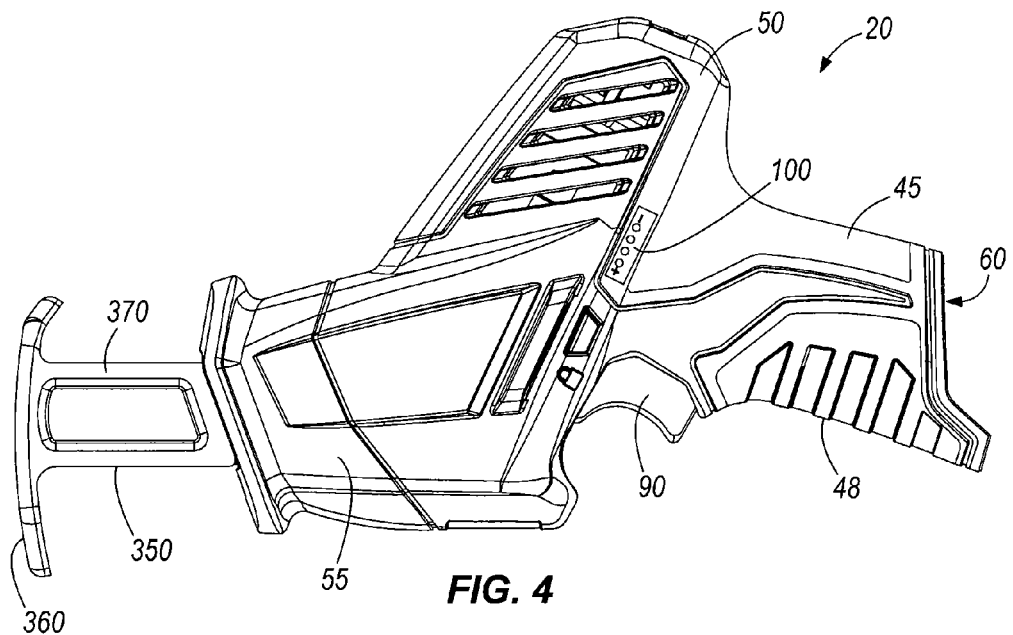
FIG. 4 is another side view of the portable reciprocating saw shown in FIG. 1*a*.
Figure 6:
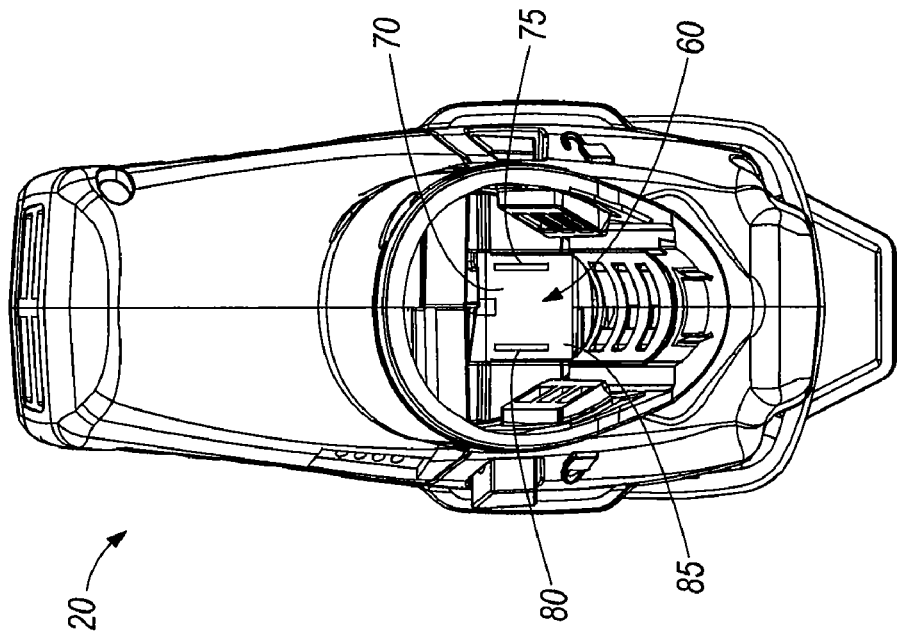
FIG. 6 is a rear view of the portable reciprocating saw shown in FIG. 1*a*.
Figure 5:
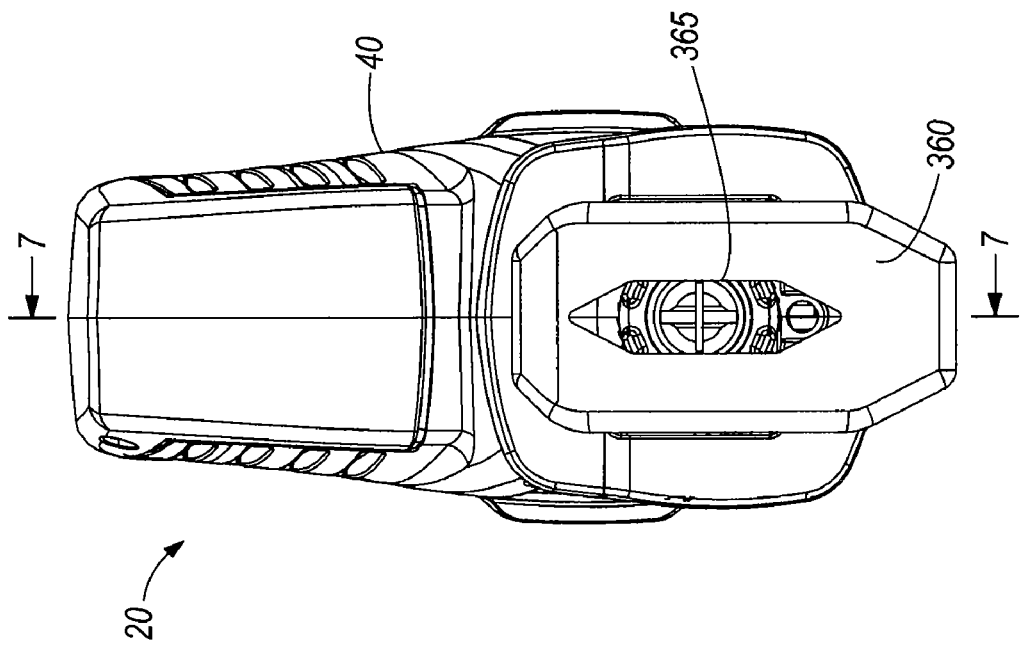
FIG. 5 is a front view of the portable reciprocating saw shown in FIG. 1*a*.

A fuel gauge 100 is positioned on the motor housing portion 50 just above the handle housing portion 45, as shown in FIG. 4. The fuel gauge 100 is activated and controlled by the monitoring circuit 105. The circuit 105 is positioned within the housing 40 and communicates with the battery pack 25. The monitoring circuit 105 periodically senses the state of charge of the battery pack 25 via the sense terminal 85 and displays the remaining state of charge to the user with a visual indication via the fuel gauge 100. For example, in the illustrated construction, the fuel gauge 100 includes four (4) LEDs. To display 100% state of charge remaining in the pack 25, the circuit 105 would activate all four (4) LEDs. To display 75% state of charge remaining, the circuit 105 would activate three (3) LEDs. For 50% state of charge remaining, two (2) LEDs would be activated, and for 25% state of charge remaining, one (1) LED would be activated. To display 10% state of charge remaining or a low state of charge warning, one (1) LED would be flashing.

In the construction shown, the fuel gauge 100 is activated when the user actuates the switch 90. In other constructions, the fuel gauge 100 may be activated when the user actuates a secondary switch (not shown), such as a push button.

Figure 9:
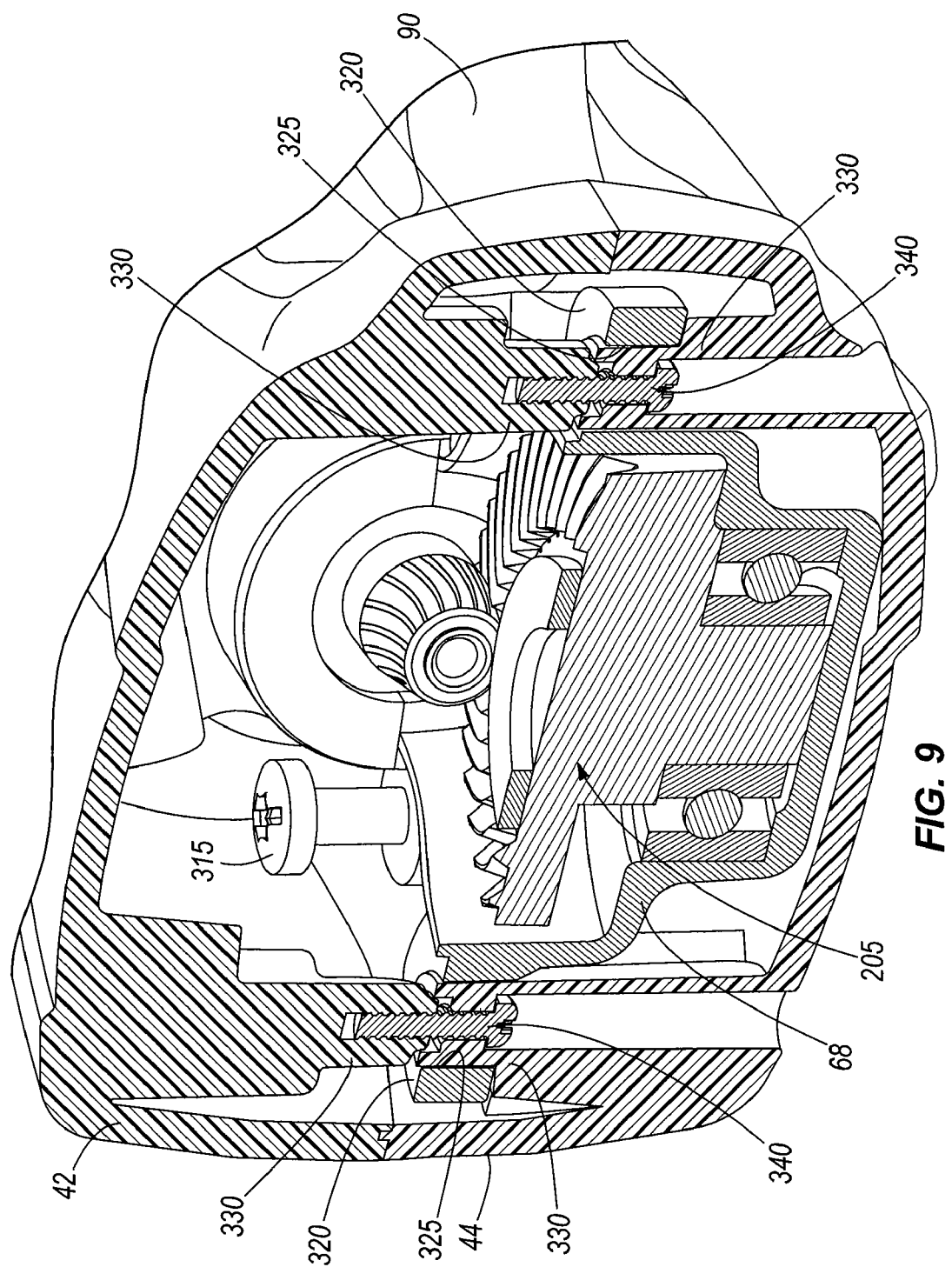
FIG. 9 is a detailed view of a portion of the gear case and housing of the portable reciprocating saw shown in FIG. 1*a*.

Referring to FIGS. 7-9, the gear case 68 encloses a drive system 205 for the saw 20. In this construction, the drive system 205 is a scotch yoke mechanism. The drive system 205 includes a driving gear 210, a driven gear 215, a pin 225 connected to the driven gear 215, and a yoke 230. In this construction, the driving gear 210 is a spiral bevel pinion and the driven gear 215 is a spiral bevel gear. The yoke 230 is connected to a spindle assembly 235. The spindle assembly 235 includes a spindle shaft 240 and a blade clamp 260. As shown in FIG. 1, a tool element 250, such as a blade, is coupled to the spindle shaft 240 via the blade clamp 260. In the construction shown, the blade clamp 260 includes the blade clamp assembly shown and described in U.S. Pat. No. 6,725,548, entitled "Keyless Blade Clamp Mechanism" and issued Apr. 27, 2004, the contents of which are hereby incorporated by reference. The blade clamp 260 can also be configured to accept a variety of reciprocating saw blades, jig saw blades and/or hack saw blades.

In operation, the pinion 210 is coupled directly to the output shaft of the motor 65. As the output shaft rotates, the pinion 210 rotates and engages teeth of the spiral bevel gear 215 to rotate the gear 215. As the spiral bevel gear 215 rotates, the pin 225 coupled to the gear 215 also rotates. The yoke 230 includes a shaft 245 that surrounds the pin 225 of the gear 215. Thereby, the yoke 230 translates back and forth due to the pin 225 rotating within the shaft 245. The yoke 230 in turn translates the spindle 240 in the desired reciprocating motion.

The gear case 68 also includes a first case portion 305 and a second case portion 310. In the construction shown, the gear case portions 305, 310 are metal cases. When assembled, gear case portions are secured via fasteners 315. In the construction shown, each portion 305, 310 includes one or more tabs or hoops 320. Each tab 320 includes an aperture 325 that extends through the tab 320, such that the apertures 325 align with and/or receive the bosses 330 formed in the housing portions 42, 44. In other constructions, the tabs or hoops 320 can be positioned on just one gear case portion, such as, for example, the first case portion 305, but not positioned on the other gear case portion, such as, for example, the second case portion 310. In further constructions, the tabs 320 can be formed on each gear case portion 305, 310. However, the tabs 320 positioned on the first case portion 305 may not align with the tabs 320 positioned on the second case portion 310. In this construction, the tabs 320 positioned on the first case portion 305 will only align with some of the bosses 330, while the tabs 320 positioned on the second case portion 310 will only align with the remaining bosses 330. In still further constructions, the tabs 320 can be configured in a different shape or manner.

As shown in FIG. 9, when the saw 20 is assembled, each of the bosses 330 formed in the housing portions 42, 44 align with one of the apertures 325 of the respective tab 320 formed in the gear case 68. Further, each of the bosses 330 formed in the first housing portion 42 substantially align in the tabs 320 with the bosses 330 formed in the second housing portion 44. The bosses 330 at least partially extend through the tabs 320, such that the tab 320 surrounds a portion of at least one of the bosses 330. In some constructions, the bosses 330 from each housing portion 42, 44 contact each other within the tab 320. However, in other constructions, the bosses 330 from each housing portion 42, 44 may be adjacent, although not in physical contact, with each other. In other constructions, the bosses 330 may be of different height, such that to engage with each other, bosses 330 on one of the housing portions 42, 44 extend further than the bosses 330 on the other of the housing portions 42, 44.

Fasteners 340 are inserted into the bosses 330 to couple the first housing portion 42 to the second housing portion 44 and further secure the gear case 68 within the housing 40. Since the fasteners 340 reside within the bosses 330, the fasteners 340 are electrically isolated from the gear case 68, including the drive system 205 and spindle shaft 240 that are contained in the gear case 68, and thereby the gear case 68 is electrically isolated within the housing 40 and from the rest of saw 20.

Figure 3:
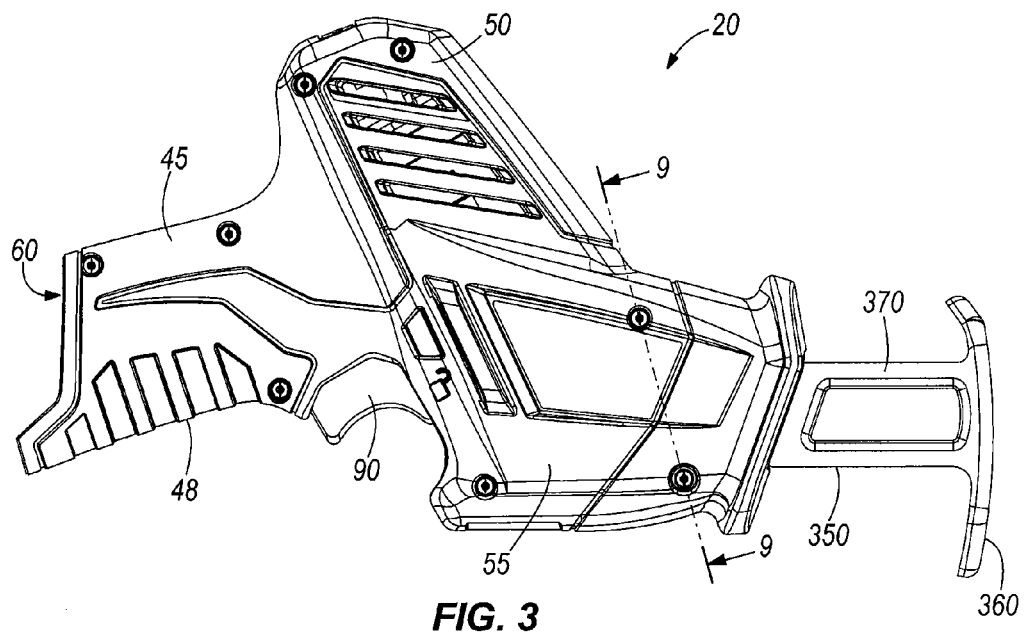
FIG. 3 is a side view of the portable reciprocating saw shown in FIG. 1*a*.

The saw 20 also includes a shoe assembly 350. In the construction shown, the shoe assembly 350 is a fixed shoe assembly. The shoe assembly 350 includes a front surface or plate 360 which engages or rests on a workpiece. As shown in FIGS. 3, 4 and 7, the front surface 360 is slightly curved outward from the saw 20, or non-planar. The front surface 360 is curved such that any three points on the front surface 360 lying in a plane parallel to a center plane (coplanar with axis 420) of saw 20 defines an arc or radius of curvature of approximately 170 mm. In other constructions (not shown), the plate 360 may have a radius greater than or less than 170 mm The front plate 360 also defines an opening 365 for the saw blade 250 to pass through. The shoe assembly 350 further includes a top portion 395 coupled to the top of the front surface 360 and lying outside of the 170 mm arc. The shoe assembly 350 also includes two connecting members 370 for connecting the shoe assembly 350 to the housing 40. In other constructions (not shown), the shoe assembly 350 may be an adjustable shoe assembly or a pivoting shoe assembly.

As shown in FIG. 7, the battery pack 25 is inserted into the battery cavity 60 of the saw 20 along a handle axis 400, which also defines a battery insertion axis. The motor 65 is positioned within the housing 40 and defines a longitudinal motor axis 410 along a length of the motor 65. The gear case is also positioned along the motor axis 410. The spindle 240 and the saw blade 250 are positioned along a longitudinal spindle axis 420 defined along a length of the spindle 240 and saw blade 250. The reciprocating motion of the spindle 240 translates back and forth along the spindle axis 420.

The axes 400, 410, 420 are positioned such that each axis 400, 410, 420 is oblique, or not otherwise perpendicular and/or parallel with respect to the other axes. More specifically, the handle axis 400 is positioned at an angle α with respect to the motor axis 410, the motor axis 410 is positioned at an angle θ with respect to the spindle axis 420, and the spindle axis 420 is positioned at an angle β with respect to the handle axis 400. In some embodiments, each of the axes 400, 410, 420 may be either non-parallel or non-orthogonal with respect to each of the other axes 400, 410, 420.

In the illustrated construction and referring to FIG. 7, each of the axes 400, 410, 420 is oblique with respect to the other axes 400, 410, 420. Angle α is an angle defined between the handle axis 400 and the motor axis 410 and is in a range of approximately 75 degrees to 95 degrees. In the illustrated embodiment, angle α is 85 degrees. In still other contructions, angle a may be greater than 95 degrees or less than 75 degrees. Angle θ is an angle defined between the motor axis 410 and the spindle axis 420 and is in a range of approximately 110 degrees to 130 degrees. In the illustrated construction, angle θ is approximately 120 degrees. In other constructions, angle θ may be greater than 130 degrees or less than 110 degrees. Angle β is an angle defined between the handle axis 400 and the spindle axis 420 and is in a range of approximately 150 degrees to 170 degrees. In the illustrated construction, angle β is approximately 161.7 degrees. In other constructions, angle β is greater than 170 degrees or less than 150 degrees.

The position of the axes, the size of the tool, and other characteristics are designed for optimal cutting application for the saw 20, including but not limited to PVC cutting, dry wall cutting, light metal cutting, EMT or thin wall conduit cutting and the like. For example, the orientation of motor 65 along motor axis 410 allows the saw 20 to be more compact by reducing the overall length of saw 20 as compared to the length of a conventional saw. Saw 20 is also ergonomically designed such that the longitudinal axis 400 is positioned for optimal user operation related to handle grip location and angle for performing a cutting operation.

FIGS. 10-16 illustrate a reciprocating power tool 520 according to another embodiment of the invention. The reciprocating power tool 520, which is a reciprocating saw in the illustrated embodiment, includes features similar to the saw 20 of FIGS. 1-9. Accordingly, components of the saw 520 illustrated in the embodiment of FIGS. 10-16 that are similar to components of the saw 20 illustrated in the embodiment of FIGS. 1-9 have been given similar reference numbers, plus 500. Also, only differences between the saw 20 of FIGS. 1-9 and the saw 520 of FIGS. 10-16 will be discussed in detail below and it should be understood that the features and alternative constructions of the saw 20 discussed above could also be applied to the saw 520 of FIGS. 10-16.

Figure 10:
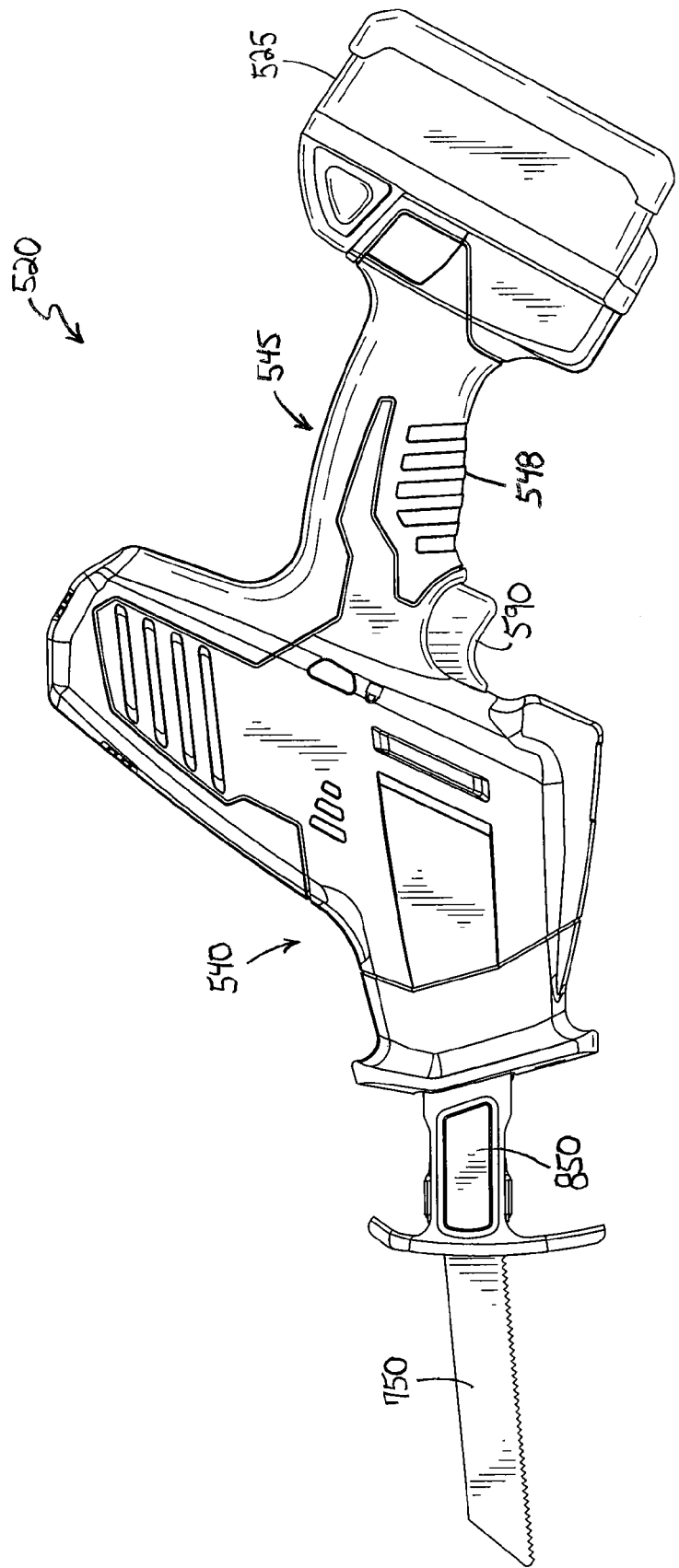
FIG. 10 is a side view of a portable battery-powered reciprocating saw according to another embodiment of the invention.

Referring to FIG. 10, the illustrated saw 520 is powered by a battery pack 525, which is an 18 Volt lithium-ion battery back in one embodiment. In other embodiments, other types of batteries, such as the batteries described above with regard to the saw 20 may be used. In yet other embodiments, the saw 520 may be a corded power tool. Furthermore, while the illustrated reciprocating power tool 520 is a reciprocating saw, in other embodiments, other types of reciprocating power tools may be used.

Figure 11:
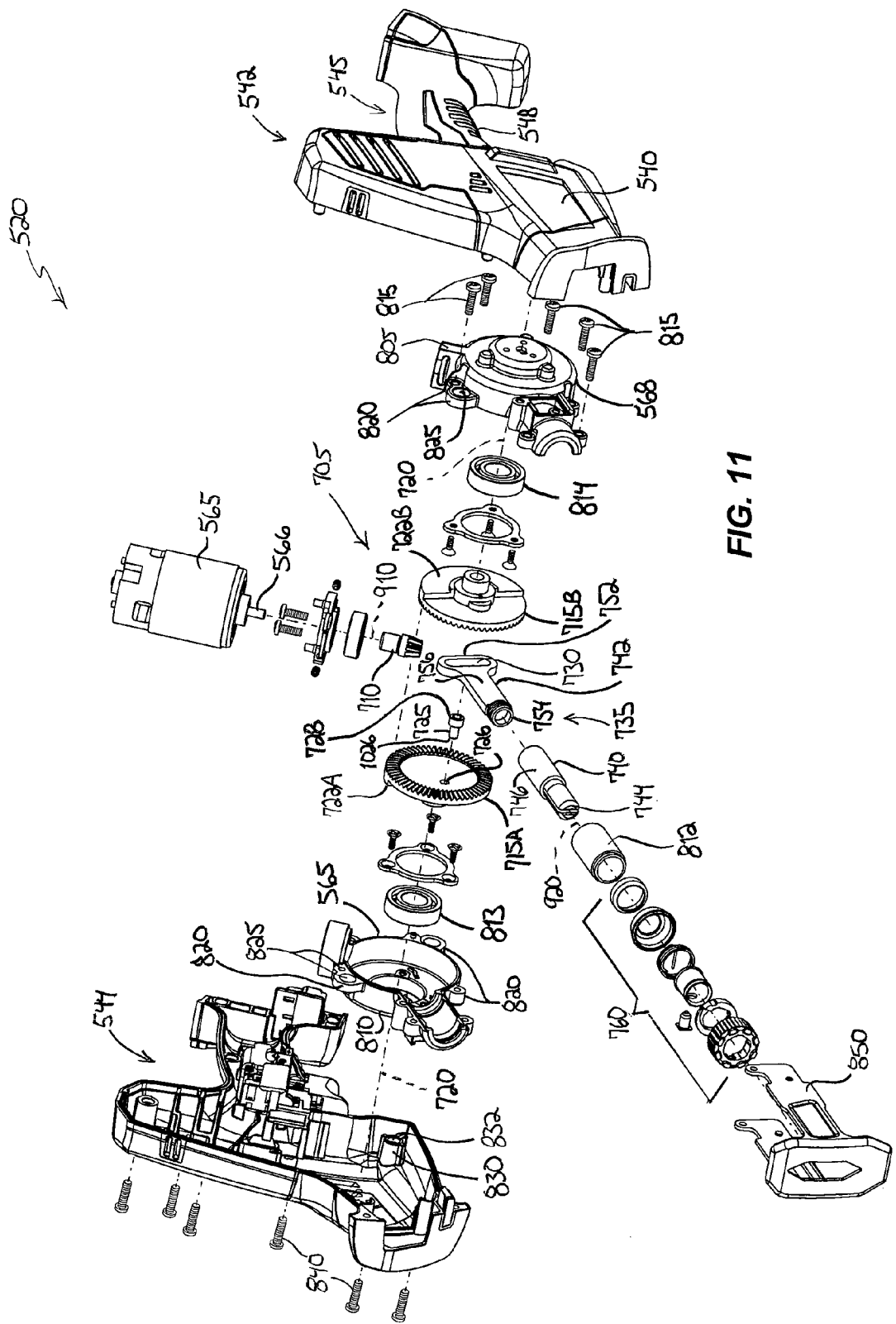
FIG. 11 is an exploded view of the saw shown in FIG. 10.
Figure 12:
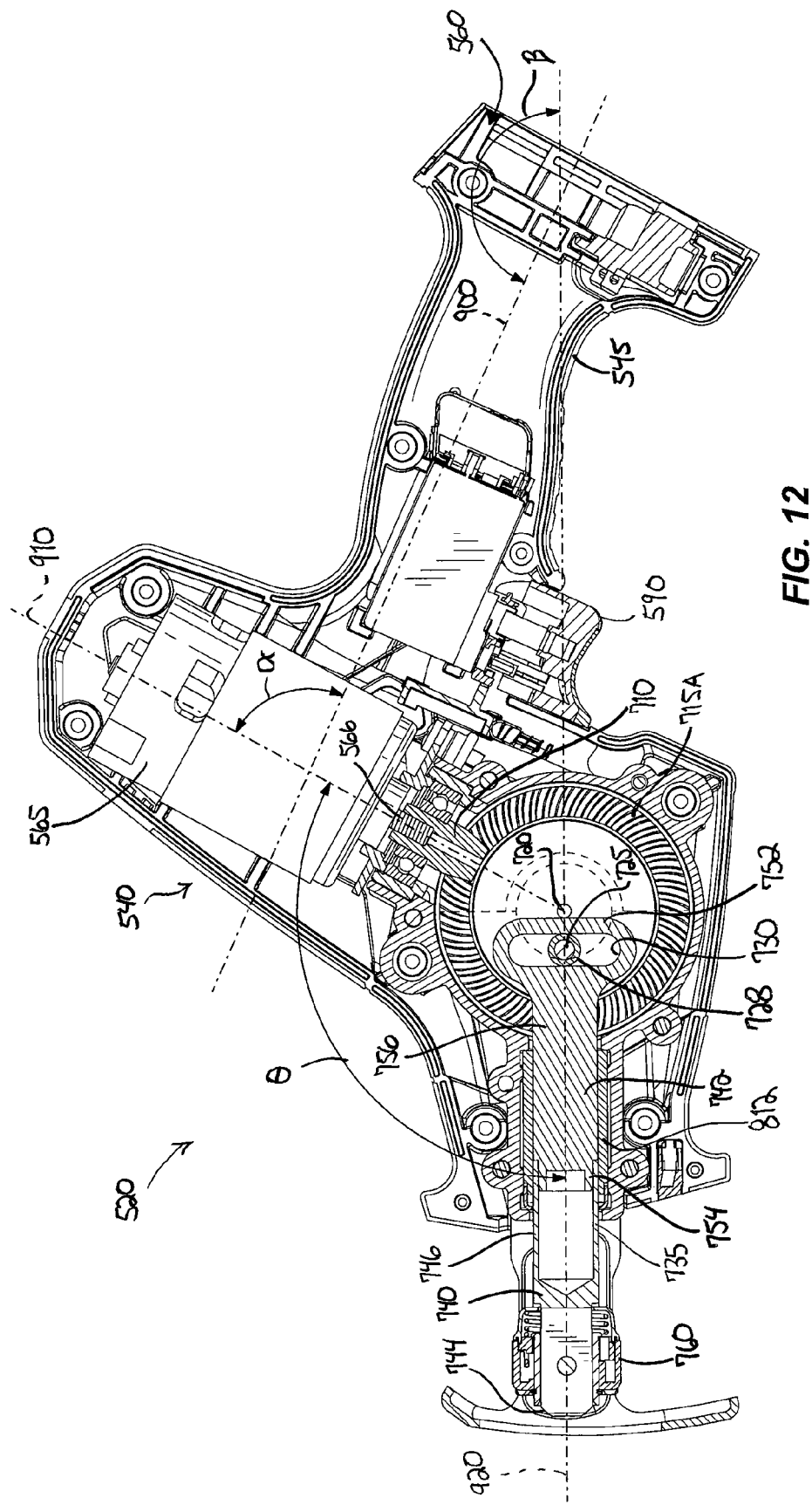
FIG. 12 is a cross section view of the saw shown in FIG. 10.

Referring to FIG. 11, the saw 520 includes a housing 540 having a first housing portion 542 and a second housing portion 544. The housing 540 defines a handle portion 545 of the saw 520, and the handle portion 545 defines a longitudinal axis 900 (FIG. 12). A motor 565 is supported by the housing 540 and includes an output shaft 566. The motor 565 is operable to rotate the output shaft 566 about a longitudinal axis 910 of the shaft 566 in response to operation of a switch 590 (FIG. 10) by a user.

The saw 520 further includes a drive system 705 coupled to the output shaft 566 of the motor 565. The drive system 705 converts rotation of the output shaft 566 to reciprocation of a tool element 750 (FIG. 10), which is a saw blade in the illustrated embodiment. The drive system 705 includes a driving gear or pinion 710 that is coupled to the shaft 566 for rotation with the shaft 566. In the illustrated embodiment, the pinion 710 is a spiral bevel gear having 8 teeth, but in other embodiments, the pinion has more or less than 8 teeth and other types of gears may be used.

The drive system 705 further includes a first driven gear 715A and a second driven gear 715B. The driven gears 715A, 715B engage the pinion 710 such that rotation of the pinion 710 rotates the gears 715A, 715B about an axis 720. In the illustrated embodiment, the driven gears 715A, 715B are identical so that only one part is manufactured and the part is used as either driven gear 715A or 715B. Also, in the illustrated embodiment, the driven gears 715A, 715B are spiral bevel gears each having 54 teeth. In other embodiments, the gears 715A, 715B have more or less than 54 teeth, and other types of gears may be used.

The gears 715A, 715B both include a spindle counterbalance weight 722A, 722B, respectively. The counterbalance weights 722A, 722B offset the center of gravity of the respective gear 715A, 715B so that the center of gravity of the gear 715A, 715B is not at the axis of rotation 720, but rather the center of gravity of each gear 715A, 715B is radially offset from the axis 720 by the mass of the respective counterbalance weight 722A, 722B. The counterbalance weights 722A, 722B reduce vibrations during operation of the saw 520, which will be discussed in more detail below. The illustrated counterbalance weights 722A, 722B are integrally formed with the gears 715A, 715B, respectively, such as by forging, casting, sintering, milling, machining, and the like.

The saw 520 further includes a spindle 735. The illustrated spindle 735 includes a first portion 740 and a second portion 742 that is coupled to the first portion 740. The first portion 740 of the spindle 735 defines a first end 744 of the spindle 735 and the first portion 740 includes a cylindrical portion 746. A blade clamp 760 is coupled to the first end 744 of the spindle 735. The blade clamp 760, as discussed above with regard to the saw 20, is configured to attach the saw blade 750 (FIG. 10) to the spindle 735.

Figure 13:
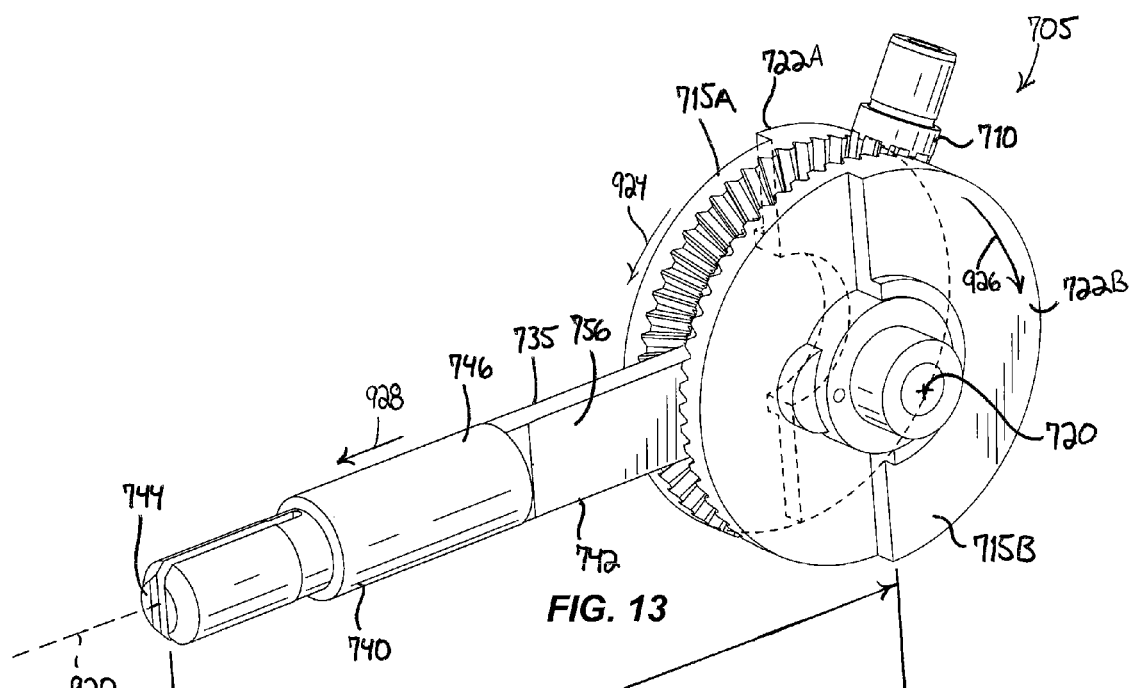
FIG. 13 illustrates a drive system of the saw of FIG. 10 with a spindle of the saw in an extended position.

The second portion 742 of the spindle 735 includes a threaded cylindrical portion 754, a flat sidewall portion 756, and a yoke 730. The threaded cylindrical portion 754 is used to couple the first portion 740 of the spindle 735 to the second portion 740. As illustrated in FIG. 12, the threaded portion 754 of the second portion 742 is received within the first portion 740 of the spindle 735 to couple the first and the second portions 740, 742. As best seen in FIG. 13, the flat sidewall portion 756 reduces the outer dimensions of the spindle 735 so that the spindle 735 can fit between the gears 715A, 715B. Also, the relatively small distance between the flat sidewall portion 756 of the spindle 735 and the gears 715A, 715B limits rotation of the spindle 735 about a longitudinal axis 920 of the spindle 735.

Referring to FIGS. 11 and 12, the illustrated yoke 730 is formed by an oval aperture that extends through the spindle 735. Accordingly, the yoke 730 is integrally formed with the spindle 735 as a single component. In other embodiments, the yoke may be alternatively formed with the spindle, such as the yoke 230 of FIGS. 7 and 8 that is formed by the shaft 245.

With continued reference to FIGS. 11 and 12, the drive system 705 further includes a pin 725. The pin 725 is received in an aperture 726 of the first driven gear 715A so that the pin 725 rotates with the driven gear 715A about the axis 720. Alternately, the pin 725 may be coupled for rotation with the second driven gear 715B that rotates in an opposite direction as the driven gear 715A. The pin 725 supports a bearing 728, and the pin 725 extends into the yoke 730 to position the bearing 728 within the yoke 728 (FIG. 12). The bearing 728 rolls within the yoke 730 and reduces friction between the pin 725 and yoke 730 when the pin 725 rotates with the gear 715A.

Referring to FIG. 11, the saw 520 further includes a gear case 568 having a first case portion 805 and a second case portion 810 that enclose the drive system 705 to protect the drive system 705 from dust, debris, and the like. The gear case 568 includes a cylinder 812 (FIG. 12) that receives the cylindrical portion 746 of the spindle 735 in order to guide reciprocating movement of the spindle 735 along the axis 920. The gear case 568 supports bearings 813 and 814. The bearing 813 is coupled to the first driven gear 715A to facilitate rotation of the gear 715A with respect to the gear case 568, and the bearing 814 is coupled to the second driven gear 715B to facilitate rotation of the gear 715B with respect to the gear case 568. As discussed above with regard to FIGS. 1-9, fasteners 815 couple the gear case portions 805, 810 together and the fasteners 840 couple the gear case 568 to the housing 540.

In operation, referring to FIGS. 10 and 13, a user grasps a handle portion 545 of the housing 540 and presses the switch 590, which causes the motor 565 to rotate the output shaft 566 and the pinion 710 about the axis 910. In the illustrated construction, the shaft 566 and the pinion 710 are rotated about the axis 910 in a direction that causes the first driven gear 715A to rotate in the direction of arrow 924 of FIG. 13 (e.g., counterclockwise about the axis 720 as illustrated in FIG. 13) and the second driven gear 715B to rotate in the opposite direction or in the direction of arrow 926 of FIG. 13 (e.g., clockwise about the axis 720 as illustrated in FIG. 13).

Figure 14:
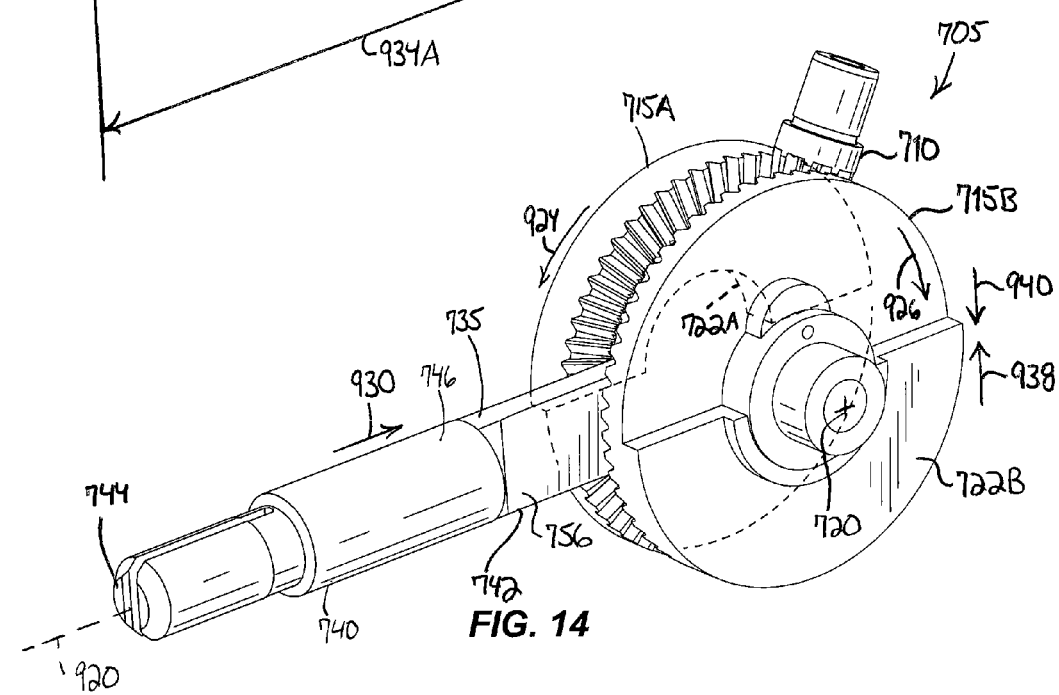
FIG. 14 illustrates the drive system of FIG. 13 with the spindle in a first intermediate position.
Figure 15:
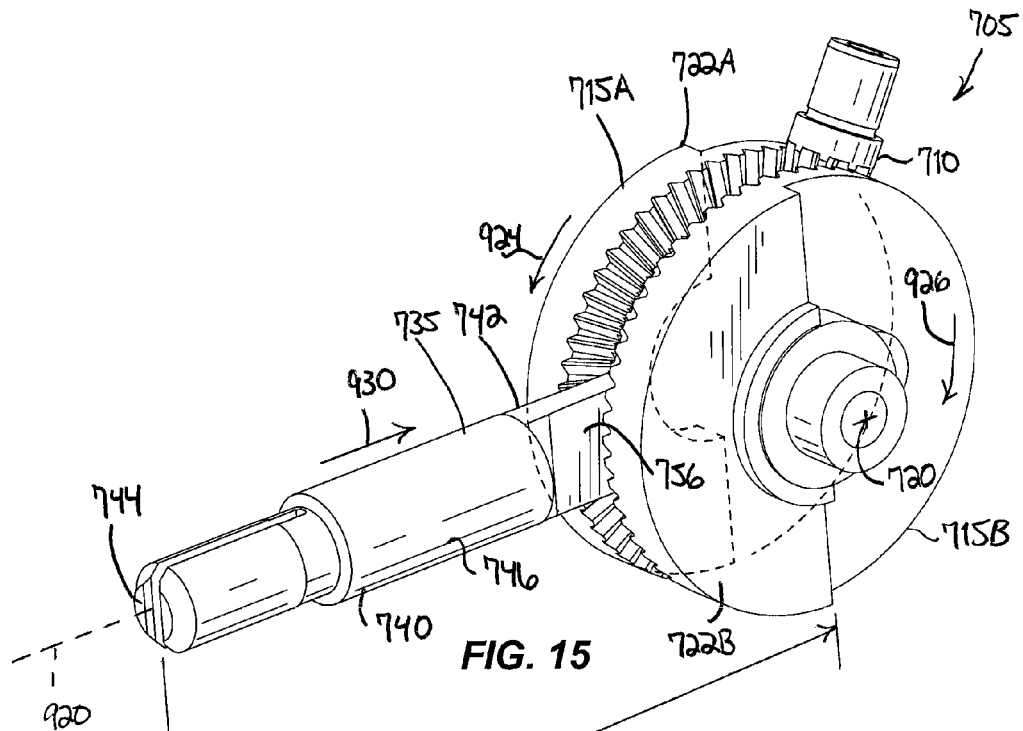
FIG. 15 illustrates the drive system of FIG. 13 with the spindle in a retracted position.
Figure 16:
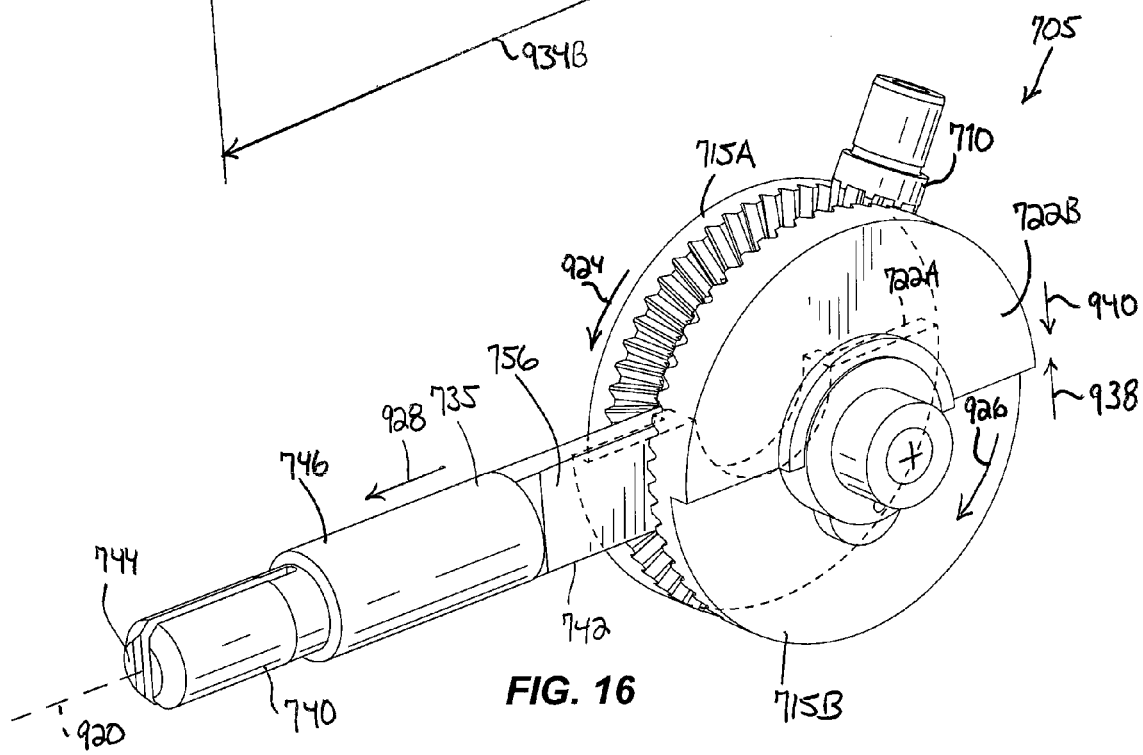
FIG. 16 illustrates the drive system of FIG. 13 with the spindle in a second intermediate position.

Rotation of the first driven gear 715A about the axis 720 causes the pin 725 to also rotate about the axis 720. Rotation of the pin 725 around the axis 720 reciprocates the spindle 735 with respect to the housing 540 along the longitudinal axis 920 of the spindle 735. The spindle 735 reciprocates in the directions of arrows 928 (FIGS. 13) and 930 (FIG. 14) between an extended position (FIG. 13) and a retracted position (FIG. 15). The extended position of the spindle 735 (FIG. 13) is defined as the position of the spindle 735 when a distance 934A between the first end 744 of the spindle 735 and the axis of rotation 720 of the gears 715A, 715B is the greatest. The retracted position of the spindle 735 (FIG. 15) is defined as the position of the spindle 735 when a distance 934B between the first end 744 of the spindle 735 and the axis of rotation 720 of the gears 715A, 715B is the lowest. Intermediate positions are defined as any position of the spindle 735 between the extended position and the retracted position, and two intermediate positions are illustrated in FIGS. 14 and 16.

The imbalanced gears 715A, 715B, caused by the spindle counterbalance weights 722A, 722B, counterbalance a reciprocating mass of the spindle 735, which is the blade clamp 760 (FIG. 12), and the saw blade 750 (FIG. 10) (collectively hereinafter—"reciprocating mass"). For example, referring to FIG. 13, when spindle 735 is in the extended position, both counterbalance weights 722A, 722B are in a rearward position to counterbalance the outward movement of the reciprocating mass in the direction of arrow 928. As the pinion 710 continues to rotate, the reciprocating mass moves from the position illustrated in FIG. 13 inward or in the direction of arrow 930 (FIG. 14) to the intermediate position illustrated in FIG. 14. As the gear 715A rotates to move the spindle 735 from the retracted position toward the intermediate position illustrated in FIG. 14, the counterbalance weight 722A rotates in the direction of arrow 924 and from the position illustrated in FIG. 13 to the position illustrated in FIG. 14. Meanwhile, the gear 715B rotates in the opposite direction (direction of arrow 926) and the counterbalance weight 722B rotates in the direction of arrow 926 from the position illustrated in FIG. 13 to the position illustrated in FIG. 14. In the intermediate position illustrated in FIG. 14, the counterbalance weight 722A is in an upper position and the counterbalance weight 722B is in a lower position. In the upper position, the counterbalance weight 722A is directly above the counterbalance weight 722B. The opposed positions of the counterbalance weights 722A, 722B in FIG. 14 balance any vibration in the direction of arrows 938 and 940 (FIG. 14) caused by rotation of the counterbalance weights 722A, 722B and that are normal to the reciprocating axis 920.

Referring to FIG. 15, when the spindle 735 is in the retracted position, the counterbalance weights 722A, 722B are in a forward position to counterbalance the inward movement of the reciprocating mass in the direction of arrow 930. As the pinion 710 continues to rotate, the reciprocating mass moves from the position illustrated in FIG. 15 outward or in the direction of arrow 928 to the intermediate position illustrated in FIG. 16. The gear 715A rotates in the direction of arrow 924 to move the spindle 735 from the retracted position (FIG. 15) toward the intermediate position illustrated in FIG. 16. The rotation of the gear 715A causes the counterbalance weight 722A to move from the position illustrated in FIG. 15 to the position illustrated in FIG. 16. Meanwhile, the pinion 710 causes the gear 715B to rotate in the direction of arrow 926, which causes the counterbalance weight 722B to move from the position illustrated in FIG. 15 to the position illustrated in FIG. 16. In the intermediate position illustrated in FIG. 16, the counterbalance weight 722A is in the lower position and the counterbalance weight 722B is in the upper position. In the lower position, the counterbalance weight 722A is directly below the counterbalance weight 722B. Again, the opposed positions of the counterbalance weights 722A, 722B in FIG. 16 balance any vibration in the direction of arrows 938 and 940 that are normal to the reciprocating axis 920 caused by rotation of the counterbalance weights 722A, 722B.

Accordingly, the counterbalance weights 722A, 722B reduce vibrations caused by the reciprocating mass along the reciprocating axis 920. Meanwhile, the counterbalance weights 722A, 722B do not add additional vibrations in directions normal to the axis 920 (e.g., the direction of arrows 938, 940) because the gears 715A, 715B rotate in opposite directions and one of the counterweights 722A or 722B is at least partially above the other counterweight 722B or 722A in the intermediate positions of the spindle 735 to provide balance in the directions 938, 940 (which are shown as vertical in FIGS. 13-16).

Furthermore, the saw 520 utilizes a scotch yoke mechanism that further reduces vibration normal to the axis 920 or in the direction of arrows 938, 940. Together the pin 725, the yoke 730, and the gear 715A form a portion of the scotch yoke mechanism. A scotch yoke mechanism converts rotational motion to linear motion of a slider or vice-versa. A scotch yoke mechanism is distinguishable from a slider crank mechanism. A slider of a slider crank mechanism is connected to a crank via a connecting rod. As the crank of the slider crank mechanism rotates, the connecting rod travels in two directions along the longitudinal axis and in directions oblique to the longitudinal axis. For example, referring to FIGS. 13 and 14, if the drive system 705 used a slider crank mechanism, the spindle 735 would reciprocate along the longitudinal axis 920 (direction of arrows 928, 930) and also oblique to the longitudinal axis 920 (e.g., there would be movement of the spindle 735 in the directions of arrows 938, 940). Reciprocation of the spindle 735 oblique to or normal to the longitudinal axis 920 creates additional vibrations in the direction of arrows 938, 940. These additional vibrations are not created by the scotch yoke mechanism of the saw 520 because the scotch yoke mechanism causes the spindle 735 to reciprocate only in the direction of arrows 928, 930 that are parallel to the longitudinal axis 920 and the spindle 735 does not reciprocate in directions that are oblique to or normal to the longitudinal axis 920.

Similar to the saw 20 of FIGS. 1-9, the axes 900, 910, and 920 of the saw 520 of FIGS. 10-16 are orientated to reduce the overall length of the saw 520 as compared to the length of a conventional saw.

Referring to FIG. 12, the axes 900, 910, 920 are positioned such that each axis 900, 910, 920 is oblique, or not otherwise perpendicular or parallel with respect to the other axes. More specifically, the handle axis 900 is positioned at an angle $\alpha$ with respect to the motor axis 910, the motor axis 910 is positioned at an angle $\theta$ with respect to the spindle axis 920, and the spindle axis 920 is positioned at an angle $\beta$ with respect to the handle axis 900. In some embodiments, each of the axes 900, 910, 920 may be either non-parallel or non-orthogonal with respect to each of the other axes 900, 910, 920.

In the illustrated embodiment and referring to FIG. 12, each of the axes 900, 910, 920 is oblique with respect to the other axes 900, 910, 920. Angle $\alpha$ is an angle defined between the handle axis 900 and the motor axis 910 and is in a range of approximately 75 degrees to 95 degrees. In the illustrated embodiment, angle $\alpha$ is 85 degrees. In still other embodiments, angle $\alpha$ may be greater than 95 degrees or less than 75 degrees and could be in a range of approximately 30 degrees to 150 degrees. Angle $\theta$ is an angle defined between the motor axis 910 and the spindle axis 920 and is in a range of approximately 110 degrees to 130 degrees. In the illustrated construction, angle $\theta$ is approximately 120 degrees. In other constructions, angle $\theta$ may be greater than 130 degrees or less than 110 degrees and could be in a range of approximately 30 degrees to 150 degrees. Angle $\beta$ is an angle defined between the handle axis 900 and the spindle axis 920 and is in a range of approximately 150 degrees to 170 degrees. In the illustrated embodiment, angle $\beta$ is approximately 156 degrees. In other embodiments, angle $\beta$ is greater than 170 degrees or less than 150 degrees and could be in a range of 100 degrees to 175 degrees.

Figure 17:
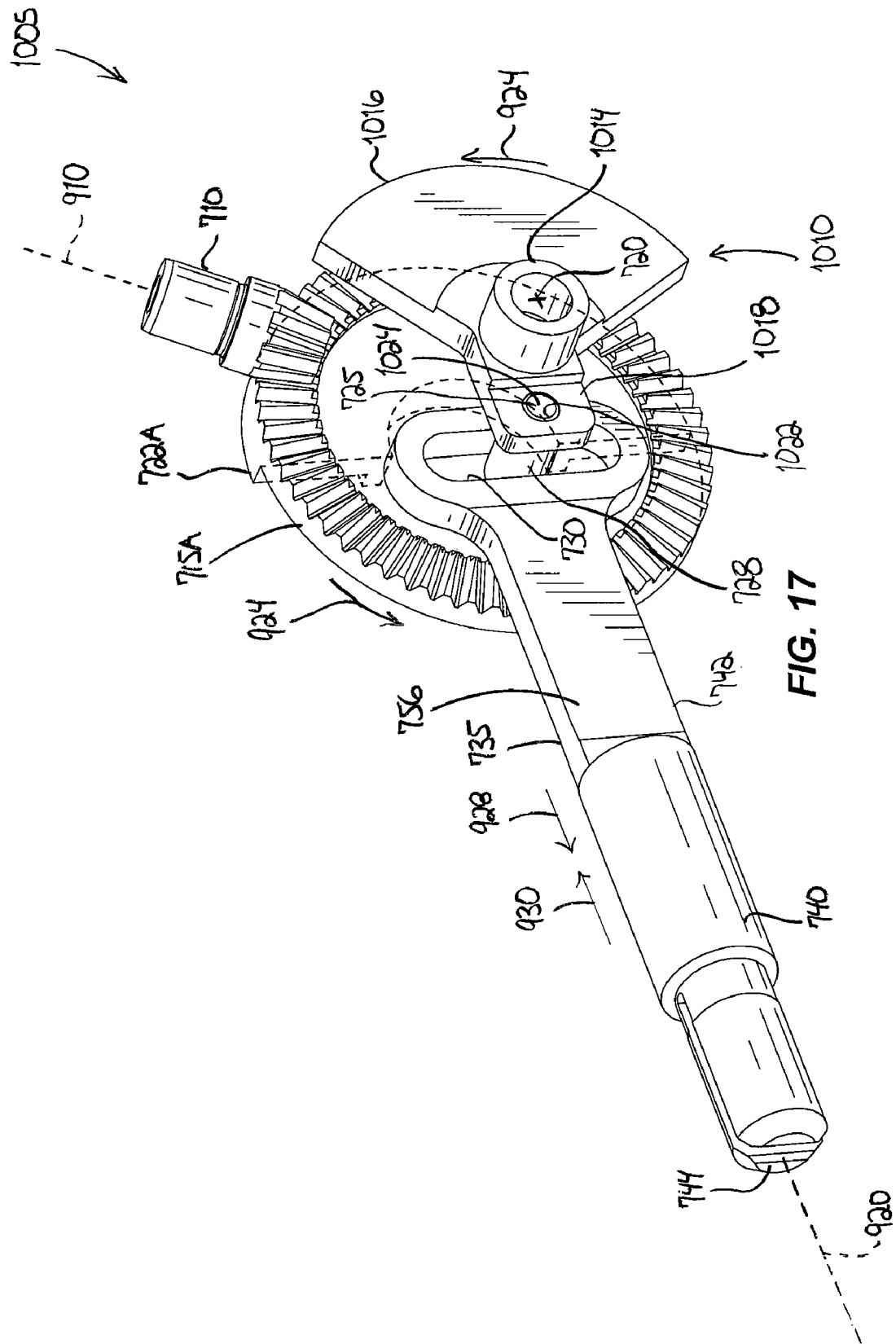
FIG. 17 illustrates a drive system of a saw according to another embodiment of the invention.

FIG. 17 illustrates a drive system 1005 of a saw according to another embodiment of the invention. The drive system 1005 of FIG. 17 can be used in the saw 520 of FIGS. 10-12 instead of the drive system 705 of FIGS. 13-16. The drive system 1005 of FIG. 17 includes components that are similar to the components of the drive system 705 of FIGS. 10-12. Therefore, like components of the drive systems 705 and 1005 have been given the same reference number and only the differences between the drive systems 705 and 1005 will be discussed in detail below.

The drive system 1005 of FIG. 17 includes a spindle counterbalance weight 1010 and the drive system 1005 does not include the second driven gear 715B of the drive system 705 of FIG. 13. Referring to FIG. 17, the spindle counterbalance weight 1010 includes a collar 1014, a relatively large lobe 1016 that extends radially from the collar 1014, and a relatively small lobe 1018 that extends radially from the collar 1014 opposite the large lobe 1016. The collar 1014 is received within the bearing 814 (FIG. 11) to rotatably couple the counterbalance weight 1010 to the first gear case portion 805. With continued reference to FIG. 17, the small lobe 1018 includes an aperture 1022 that receives a first end 1024 of the pin 725. As best seen in FIG. 11, a second end 1026 of the pin 725 is received in the aperture 726 of the driven gear 715A. As best seen in FIG. 17, the pin 725 extends through the yoke 730 to couple the driven gear 715A and the spindle counterbalance weight 1010 such that the spindle counterbalance weight 1010 rotates about the axis 720 in the direction of arrow 924 with the driven gear 715A.

In operation, the pinion 710 is rotated about the axis 910 in a direction that causes the driven gear 715A to rotate in the direction of the arrow 924 of FIG. 17 (e.g., counterclockwise about the axis 720 as illustrated in FIG. 17). Rotation of the driven gear 715A about the axis 720 causes the pin 725 to also rotate about the axis 720. Therefore, the counterbalance weight 1010 also rotates in the direction of arrow 924 about the axis 720.

Rotation of the pin 725 around the axis 720 reciprocates the spindle 735 along the longitudinal axis 920 of the spindle 735. The spindle 735 reciprocates in the directions of arrows 928 and 930 between the extended position (FIG. 17) and the retracted position (see FIG. 15).

The imbalanced gear 715A having the counterbalance weight 722A and the counterbalance weight 1010 having the large lobe 1016 counterbalance the reciprocating mass. For example, referring to FIG. 17, when spindle 735 is in the extended position, both the counterbalance weight 722A and the large lobe 1016 are in the rearward position to counterbalance the outward movement of the reciprocating mass in the direction of arrow 928. Also, when the spindle 735 is in the retracted position, the counterbalance weight 722A and the large lobe 1016 are in a forward position to counterbalance the inward movement of the reciprocating mass in the direction of arrow 930. Accordingly, the counterbalance weight 722A and the large lobe 1016 reduce vibrations caused by the reciprocating mass along the reciprocating axis 920.

Although the invention has been described in detail with reference to certain preferred embodiments, variations and modifications exist within the scope and spirit of one or more independent aspects of the invention as described.

What is claimed is:

1. A reciprocating power tool comprising:
a housing;
a motor supported by the housing and having an output shaft, the motor operable to rotate the output shaft;
a drive system coupled to the output shaft of the motor, the drive system including,
a driving gear coupled to the output shaft for rotation with the output shaft,
a first driven gear having a spindle counterbalance weight, the first driven gear coupled to the driving gear such that the first driven gear is configured to rotate about an axis of rotation in a first direction in response to rotation of the driving gear by the motor,
a second driven gear having a spindle counterbalance weight, the second driven gear coupled to the driving gear such that the second driven gear is configured to rotate about the axis of rotation in a second direction that is opposite the first direction in response to rotation of the driving gear by the motor,
a spindle having a longitudinal axis and a first end configured to support a tool element, and
wherein the spindle is coupled to one of the first driven gear and the second driven gear by a scotch yoke mechanism to reciprocate the spindle with respect to the housing along the longitudinal axis of the spindle in response to operation of the motor,
wherein the spindle counterbalance weights of the first and the second driven gears rotate with the first and the second driven gears, respectively, between an upper position, a forward position, a lower position opposite the upper position, and a rearward position opposite the forward position,
wherein the spindle reciprocates between an extended position, a retracted position, a first intermediate position, and a second intermediate position,
wherein when the spindle is in the extended position, the spindle counterbalance weights of the first and the second driven gears are in the rearward positions,
wherein when the spindle is in the retracted position, the spindle counterbalance weights of the first and the second driven gears are in the forward positions,
wherein when the spindle is in the first intermediate position, the spindle counterbalance weight of the first driven gear is in the upper position and the spindle counterbalance weight of the second driven gear is in the lower position, and
wherein when the spindle is in the second intermediate position, the spindle counterbalance weight of the first driven gear is in the lower position and the spindle counterbalance weight of the second driven gear is in the upper position.

2. The reciprocating power tool of claim 1, further comprising,
a yoke coupled to the spindle,
wherein the drive system further includes a pin coupled to one of the first driven gear and the second driven gear for rotation with the one of the first driven gear and the second driven gear, and
wherein the pin is received within the yoke to reciprocate the spindle with respect to the housing along the longitudinal axis of the spindle in response to rotation of the one of the first driven gear and the second driven gear.

3. The reciprocating power tool of claim 2,
wherein the spindle includes a second end opposite the first end, and
wherein the yoke is integrally formed with the spindle as a single component and the yoke defines the second end of the spindle.

4. The reciprocating power tool of claim 1, wherein the spindle only reciprocates in directions parallel to the longitudinal axis of the spindle in response to operation of the motor.

5. The reciprocating power tool of claim 4, wherein the spindle generally does not reciprocate in directions oblique to the longitudinal axis of the spindle in response to operation of the motor.

6. The reciprocating power tool of claim 1, further comprising, a gear case substantially enclosing the drive system, the gear case having a cylinder, wherein the spindle includes a generally cylindrical portion received within the cylinder of the gear case to guide reciprocating movement of the spindle, and wherein the spindle further includes a generally flat sidewall portion positioned between the first driven gear and the second driven gear to limit rotation of the spindle about the longitudinal axis of the spindle.

7. A reciprocating saw comprising:

a housing;

a motor supported by the housing and having an output shaft, the motor operable to rotate the output shaft;

a drive system coupled to the output shaft of the motor, the drive system including, a driving gear coupled to the output shaft for rotation with the output shaft, a first driven gear having a spindle counterbalance weight, the first driven gear coupled to the driving gear such that the first driven gear is configured to rotate about an axis of rotation in a first direction in response to rotation of the driving gear by the motor, a second driven gear having a spindle counterbalance weight, the second driven gear coupled to the driving gear such that the second driven gear is configured to rotate about the axis of rotation in a second direction that is opposite the first direction in response to rotation of the driving gear by the motor, a spindle having a first end, a second end, and a longitudinal axis that extends through the first end and the second end;

a blade clamp coupled to the first end of the spindle, the blade clamp configured to couple a saw blade to the spindle; and a yoke coupled to the second end of the spindle, wherein the drive system further includes a pin coupled to one of the first driven gear and the second driven gear for rotation with the one of the first driven gear and the second driven gear, wherein the pin extends into the yoke to reciprocate the spindle with respect to the housing along the longitudinal axis of the spindle in response to operation of the motor, wherein the spindle counterbalance weights of the first and the second driven gears rotate with the first and the second driven gears, respectively, between an upper position, a forward position, a lower position opposite the upper position, and a rearward position opposite the forward position, wherein the spindle reciprocates between an extended position and a retracted position, wherein a plurality of intermediate positions are defined between the extended position and the retracted position, wherein when the spindle is in the extended position, the spindle counterbalance weights of the first and the second driven gears are in the rearward positions, wherein when the spindle is in the retracted position, the spindle counterbalance weights of the first and the second driven gears are in the forward positions, and wherein when the spindle is in the plurality of intermediate positions, at least a portion of the spindle counterbalance weight of one of the first and the second driven gears is above the counterbalance weight of the other of the first and the second driven gears.

8. The reciprocating saw of claim 7, wherein the spindle only reciprocates in directions parallel to the longitudinal axis of the spindle in response to operation of the motor.

9. The reciprocating saw of claim 8, wherein the spindle generally does not reciprocate in directions oblique to the longitudinal axis of the spindle in response to operation of the motor.

10. The reciprocating saw of claim 7, further comprising, a gear case substantially enclosing the drive system, the gear case having a cylinder, wherein the spindle includes a generally cylindrical portion received within the cylinder of the gear case to guide reciprocating movement of the spindle, and wherein the spindle further includes a generally flat sidewall portion positioned between the first driven gear and the second driven gear to limit rotation of the spindle about the longitudinal axis of the spindle.

11. The reciprocating saw of claim 7, wherein the first driven gear and the second driven gear are substantially identical.

12. The reciprocating saw of claim 7, wherein the yoke is integrally formed with the spindle as a single component.

* * * * *